United States Patent [19]

Galtier Lucien et al.

[11] Patent Number: 4,869,519

[45] Date of Patent: Sep. 26, 1989

[54] REAR STEERING CONTROL DEVICE FOR AN AUTOMOTIVE VEHICLE WITH FOUR GUIDING WHEELS

[75] Inventors: Galtier Lucien, Morsang S/Orge; André Barthelemy, Les Chevreuse, both of France

[73] Assignee: Automobiles Peugeot, Paris; Automobiles Citroen, Neuilly Sur Seine, both of France

[21] Appl. No.: 215,781

[22] Filed: Jul. 6, 1988

[30] Foreign Application Priority Data

Jul. 16, 1987 [FR] France ............................... 87 10065
May 9, 1988 [FR] France ............................... 88 06226

[51] Int. Cl.⁴ ............................................. B62D 5/06
[52] U.S. Cl. ..................................... 280/91; 180/140
[58] Field of Search ........................... 280/91; 180/140

[56] References Cited

U.S. PATENT DOCUMENTS

| 4,558,877 | 12/1985 | Furukawa et al. | 280/91 |
| 4,614,351 | 9/1986 | Sano et al. | 280/91 |
| 4,687,214 | 8/1987 | Uno | 280/91 |
| 4,703,822 | 11/1987 | Kawamoto et al. | 280/91 |
| 4,732,231 | 3/1988 | Kanazawa et al. | 280/91 |

FOREIGN PATENT DOCUMENTS

| 3344446 | 6/1984 | Fed. Rep. of Germany . |
| 2445257 | 12/1979 | France . |
| 2566360 | 6/1985 | France . |
| 2046195 | 11/1980 | United Kingdom . |
| 2151567 | 12/1984 | United Kingdom . |

Primary Examiner—Richard A. Bertsch
Attorney, Agent, or Firm—Kenyon & Kenyon

[57] ABSTRACT

The present invention concerns a rear steering control device in particular for an automotive vehicle, this device comprising a plate with at least one cam-forming part forming a recess in the plate and whose profile defines the law of deflection of the rear wheels according to the deflection of the front wheels and a roller meshing with the cam-forming part and mechanically driven by the drive shaft so that the rotation of the transmission main shaft of the vehicle causes the roller to exert a thrust on the cam-forming part.

15 Claims, 7 Drawing Sheets

REAR STEERING CONTROL DEVICE FOR AN AUTOMOTIVE VEHICLE WITH FOUR GUIDING WHEELS

BACKGROUND OF THE INVENTION

The present invention concerns a rear steering control device in particular for an automotive vehicle with four guiding wheels.

The invention concerns also an automotive vehicle equipped with such a device.

Such a device should be able to control the deflection of the rear wheels as a function of the deflection of the front wheels imparted by the steering wheel of the vehicle.

It is known that in order to obtain the best possible road behaviour of the vehicle in the conditions defined above, it is necessary to deflect the rear wheels in the same direction as the front wheels for a value of the angle of lock less than a predetermined threshold value and in the direction opposite to the front wheels when the value of the angle of lock of the steering wheel exceeds the threshold value. Therefore, a desirable oversteering effect of the vehicle is obtained when the angle of lock is relatively large, for example when the vehicle is put into a garage or a car park and an also desirable understeering effect of the vehicle is obtained when the angle of lock is relatively small as is the case when the vehicle runs relatively quickly.

A device complying with the above conditions is disclosed for example in the French Pat. No. 2,556,682.

However, this kind of device has a drawback that its geometry imposes a law of deflection that cannot be adapted to the behaviour of the vehicle according to the observations and the results of tests.

SUMMARY OF THE INVENTION

The present invention has as an object to remedy the drawback of the above known device in that it provides, for the deflection of the rear wheels, a device of such a design that the law of deflection of the rear wheels with respect to the deflection of the front wheels can be changed and whose structure has a stability comparable with that of the structure of the mechanical front steerings.

For this purpose, the rear steering control device of the Present invention, in particular for an automotive vehicle with four guiding wheels, whose rear wheels are mounted on pins and are connected through the medium of articulated rocker bars with steering rods actuating through the medium of the rocker bars the levers for pivoting the rear wheels and a control device of the type comprising a transmission main shaft mounted longitudinally with respect to the vehicle and provided with means that make it rotate about its axis as a result of an action of deflection of the front wheels of the vehicle and a rear steering mechanism mechanically connected, on the one hand, with the rear end of the transmission main shaft through the medium of a drive shaft and, on the other hand, with the rear steering rods to control the deflection of the rear wheels as a function of the deflection of the front wheels, is characterized in that the rear steering mechanism comprises a plate which is solid with the rear steering rods and which comprises at least one cam-forming part forming a recess in the plate and whose profile defines the law of deflection of the rear wheels according to the deflection of the front wheels and a roller-forming part meshing with the cam-forming part and mechanically driven by the drive shaft so that the rotation of the transmission main shaft causes the roller-forming part to exert a thrust on the cam-forming part.

According to a feature of the Present invention, the aforesaid cam-forming part is formed of a groove passing through the plate and in which the aforesaid roller-forming part is engaged.

According to another feature of the Present invention, the rear steering mechanism comprises three angularly equidistant planet wheels connected through a planet carrier formed of two flanges rotatably centered on the aforesaid drive shaft and rigidly connected to one another by the three axles respectively of the three planet wheels which mesh with the inside of a stationary ring gear and in that at least one of the axles of the planet wheels is extended to carry the aforesaid roller-forming part.

According to still another feature of the Present invention, the aforesaid plate comprises two symmetrical cam-forming parts and two of the axles of the planet wheels are extended to carry respectively two thrust rollers, one or the other of the thrust rollers meshing with the corresponding cam-forming part depending on the direction of deflection of the front wheels.

According to still another feature of the Present invention, the aforesaid drive shaft is arranged longitudinally with respect to the vehicle and is rotatably mounted by means of front and rear bearings carried by the housing of the rear steering mechanism and comprises a threaded part on which a nut-forming element is mounted which is solid with a finger carrying the aforesaid thrust roller-forming part which is engaged in the aforesaid cam-forming part.

According to another feature of the Present invention, a second roller-forming part is mounted at the free end of the finger above the thrust roller-forming part, and is engaged in a stationary guiding groove which runs parallel to the drive shaft.

Besides, the movement of the two above roller-forming parts around the finger and inside respectively the cam-forming groove and the guiding groove requires a certain running clearance in order to avoid the jamming of one or the other of the roller-forming parts in their respective groove. Therefore, due to the design of the above-described control device, clearances and backlashes exist along the direction of the axis of the rear steering rods, which axis is perpendicular to the longitudinal axis of the vehicle.

Therefore, the present invention has also as an object to eliminate the negative effects of the running clearance of each roller-forming part inside its respective groove by providing a rear steering control device in particular for an automotive vehicle with four guiding wheels of the type in which the drive shaft, which is arranged longitudinally with respect to the vehicle, is rotatably mounted in the housing of the rear steering mechanism and comprises a threaded part on which a nut-forming element is mounted which is solid with a finger carrying a first roller-forming part engaged in a cam-forming groove made through a first plate solid with the axially movable rear steering rods and a second roller-forming part engaged in a guiding groove of a second plate fastened to the housing of the rear steering mechanism and characterized in that the first plate is formed of two superimposed lower and upper plates comprising respectively two lower and upper grooves defining the cam-forming groove, the lower plate being fastened to the rear steering rods, in that the first roller-forming part comprises two superimposed rollers likely to move respectively inside the two lower and upper grooves, in that the upper plate is maintained in a shifted position, by appropriate means with respect to the lower plate so that the upper roller rests, substantially without any clearance, between the finger and a side wall of the upper groove and that the lower roller rests, substantially without any clearance, between the finger and a side wall of the lower groove opposite to the side wall of the upper groove, the outer diameter of each roller being smaller than the width of each groove.

According to a feature of the Present invention, the aforesaid second plate is formed of two superimposed lower and upper plates comprising respectively two lower and upper grooves defining the guiding groove, the second roller-forming part comprises two superimposed rollers likely to move respectively inside the two lower and upper guiding grooves and the two lower and upper plates are immobilized with respect to each other in a shifted position, by appropriate means such as fastening screws, so that the upper roller rests, substantially without any clearance, between the finger and a side wall of the upper groove and that the lower roller rests, substantially without any clearance, between the finger and a side wall of the lower groove opposite to the side wall of the upper groove, the outer diameter of each roller being smaller than the width of each guiding groove.

According to another feature of the Present invention, the aforesaid appropriate means for maintaining the upper plate with respect to the lower plate of the plate comprising the cam-forming groove are formed preferably of fastening screws which render also the upper plate solid with the rear steering rods after opposed stresses perpendicular to the drive shaft and crossing the axis of the aforesaid finger have been applied to the lower and upper plates in order to obtain the aforesaid shifting of the upper plate with respect to the lower plate.

According to still another feature of the invention, the two lower and upper plates of the aforesaid second plate are rendered solid with each other and with the housing of the rear steering mechanism after having been submitted to opposite stresses perpendicular to the drive shaft and crossing the axis of the finger so as to obtain the aforesaid shifting of the upper plate with respect to the lower plate.

According to still another feature of the invention, the upper plate of the first plate is mounted in a freely sliding and guided manner inside the housing of the rear steering mechanism between the lower plate of the second plate and the lower plate of the first plate and the aforesaid means for maintaining the upper plate of the first plate in a shifted position with respect to the lower plate comprise two identical prestressed compression springs located, on the one hand, on both sides of the axis of the rear steering rods at an equal distance of the same and, on the other hand, on both sides of the drive shaft at an equal distance of the same and each housed, in a balanced manner, inside two complementary recesses forming recessings made respectively in the upper and lower plates and resting at its extreme turns respectively on a corresponding end wall of the recess of the upper plate and on a corresponding end wall of the recess of the lower plate opposite to the first end wall so as to steadily exert efforts or stresses perpendicular to the drive shaft and crossing the axis of the finger to maintain the upper and lower plates in shifted relationship with respect to each other.

BRIEF DESCRIPTION OF THE DRAWINGS

The invention will be better understood and other objects, features, details and advantages thereof will appear more clearly as the following explanatory description proceeds with reference to the appended diagrammatic drawings given by way of example only illustrating several embodiments of the invention, and wherein.

DETAILED DESCRIPTION

Figures 1, 2:
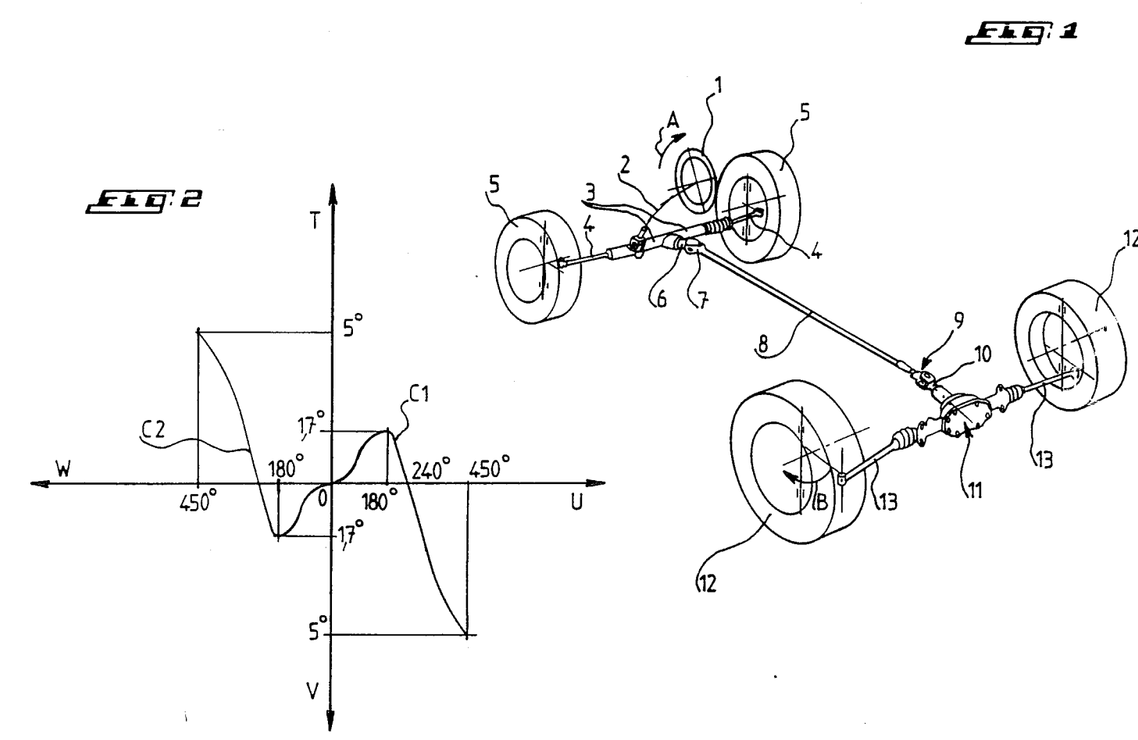
FIG. 1 is a diagrammatic perspective view of an automotive vehicle equipped with the steering device according to the Present invention.
FIG. 2 shows a curve representing the deflection of the rear wheels as a function of the deflection of the front wheels.

Referring to FIG. 1, reference sign 1 designates a steering wheel whose steering shaft 2 is connected to a rack gear train having a rack shaft 3 whose side ends are connected respectively to tie rods 4 at the outer ends of which the front wheels 5 are connected which can be angularly oriented depending on the deflection direction of the steering wheel. The rear end of a pinion shaft 6 extending behind shaft 3 is connected by an articulated joint 7 to a transmission main shaft 8 whose rear end is connected by an articulated joint 9 to a drive shaft 10 of a rear steering mechanism 11 located between both rear wheels 12 of the vehicle. The drive shaft 10 as well as the transmission main shaft 8 are mounted in a substantially longitudinal position with respect to the vehicle. The rear steering mechanism 11 is mechanically connected to steering rods controlling, through the medium of rocker bars, rear wheels 12 mounted on pins.

The rear steering mechanism 11 is adapted to deflect the rear wheels 12 in the same direction as the front wheels 5 for a value of the angle of lock of the steering wheel lower than a threshold value and in the direction opposite to that of the front wheels when the value of the angle of lock of the steering wheel exceeds the threshold value. The control of the deflection of the rear wheels 12 as a function of the deflection of the front wheels 5 proceeds according to a law such as the law represented by way of example by the curve of FIG. 2. In this Figure, the values of the angle of lock of the steering wheel are plotted on the semi-axes OU and OW in the cases where the vehicle turns on the right and turns on the left, respectively. The values of the angle of lock of the rear wheels towards the right-hand side and towards the left-hand side respectively with reference to FIG. 1 are plotted on the semi-axes OT and OV. The curve C1 comprised in the plane located on the right-hand side of the axis TOV with respect to FIG. 2 represents the two directions of deflection of the rear wheels 12 depending on the amplitude imparted to the steering wheel 1 in one direction. Thus, when the steering wheel 1 is rotated in the direction of arrow A in FIG. 1 by a small angle of lock (lower than the threshold value which in the present case is set about 180°), the rear wheels are deflected in the same direction as the front wheels, as shown by arrow B in FIG. 1, by a maximal value of the angle of about 1.7° corresponding to the threshold value so as to produce the desirable understeering effect of the vehicle. When the steering wheel is rotated by a large angle of lock, in the present case larger than the threshold value of 180°, the rear wheels are deflected in the direction opposite to arrow B, therefore opposite to the front wheels, become parallel to the longitudinal axis of the vehicle (which corresponds to an angle of lock of the steering wheel of 240°) and are further deflected up to a maximal value of the angle lock of the rear wheels towards the left of about 5° for a value of the angle of lock of the steering wheel of 450° so as to produce a desirable oversteering effect of the vehicle. The same reasoning is used with reference to curve C2 comprised in the plane located on the left-hand side of axis TOV and will not be explained in detail except that for an angle of lock of the steering wheel in the direction opposite to arrow A lower than the threshold value of 180°, the rear wheels are deflected towards the left with respect to FIG. 1 in the same direction as the front wheels whereas for a large angle of lock of the steering wheel in the same direction, the rear wheels are deflected towards the right, i.e. in the direction opposite to the front wheels after becoming parallel to the longitudinal axis of the vehicle (which corresponds to an angle of lock of the steering wheel of 240°) so as to produce respectively two desirable understeering and oversteering effects of the vehicle.

Therefore, the device according to the invention is adapted to control the deflection of the rear wheels as a function of the deflection of the front wheels according to the law of deflection defined by curve C1 or C2, it being understood that any other law, which is adapted to the road behaviour of the vehicle, can be elaborated.

Figures 3, 4, 5:
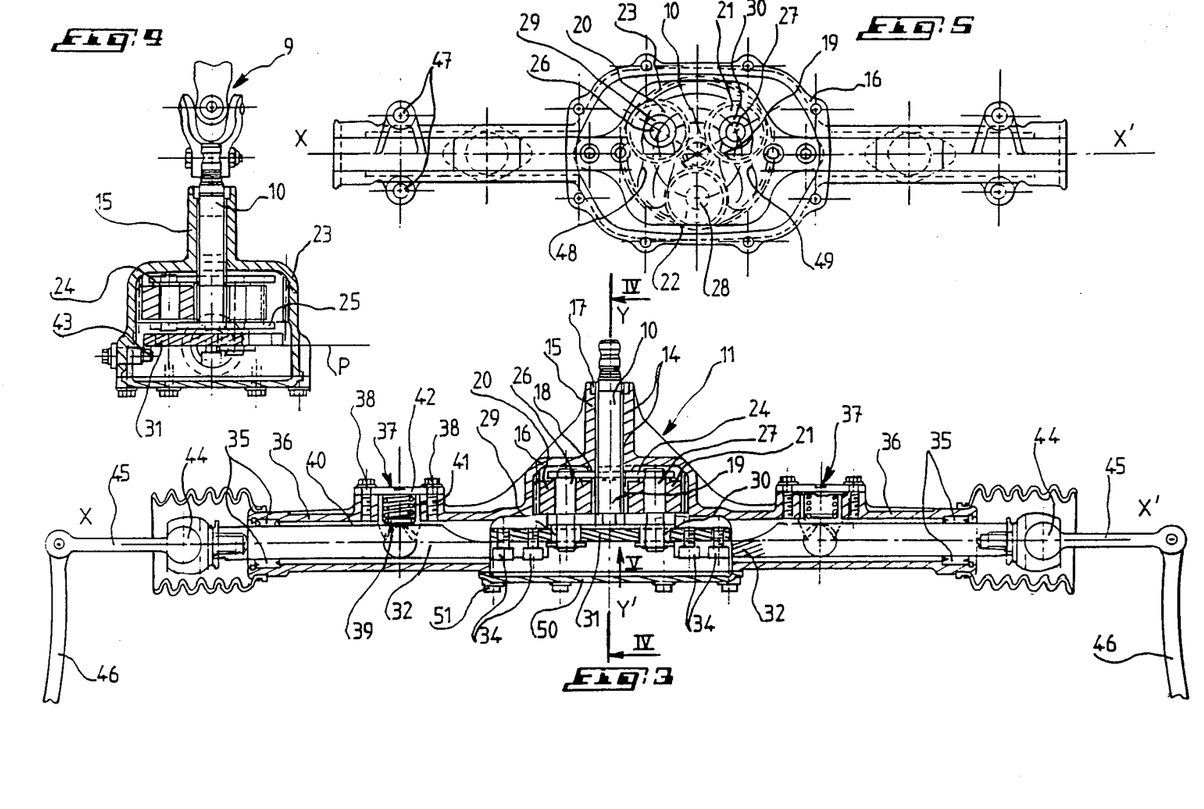
FIG. 3 is a longitudinal cross-sectional view of the rear steering mechanism of the invention.
FIG. 4 is a cross-sectional view along line IV—IV of FIG. 3.
FIG. 5 is a view along the direction of arrow V in FIG. 3.

According to a first embodiment of the device shown in FIGS. 3–5, the drive shaft 10 is rotatably mounted on a pair of front and rear bearings 14 in a tubular bearing support 15 solid with the housing 16 of mechanism 11. The shaft 10 is axially maintained in the housing 16 by a washer-spring ring assembly 17 on the outer side of the housing and by a shoulder-washer assembly 18 on the inner side of the housing. The shaft 10 comprises an input pinion 19 solid with the same and fastened in the housing 16 and meshing with three planet wheels 20–22 disposed in an angularly equidistant manner with respect to the pinion 19 of shaft 10. The three planet wheels mesh with the inside of a stationary ring gear 23 integral with the housing 16 and are rotatably guided and maintained in a relative position with the aid of two spaced and parallel flanges 24 and 25, which are rotatably centered on shaft 10 and rigidly connected to each other by the three axes 26–28 of planet wheels 20–22 respectively. Two axes 26 and 27 among the axes of the planet wheels are extended in the rear direction to carry on their extension two rollers 29 and 30 respectively. A plate 31 is rigidly connected to both rear steering rods 32 for example through the medium of fastening screws 34. The rods 32 are guided during their axial movements along axis X–X' by two pairs of bearings 35 in a longitudinal bearing carrier 36 integral with the housing 16 of the rear steering mechanism. Moreover, each rod 32 is blocked against rotation by a pusher-forming assembly 37 fastened, for example with fastening screws 38, to the longitudinal part 36 and comprising the pusher 39 itself whose end rests on a flat surface 40 of rod 32 through the action of a compression spring 41 located between the pusher 39 and the cover-forming part 42 rendered solid with part 36 by screws 38. In the place of the pusher-forming assembly 37, it is possible to provide guides 43 which are longitudinally spaced along axis X–X' under plate 31 as shown in FIG. 4 to maintain the same in the plane P comprising the rear side of the plate during its axial movements along axis X–X'. Each rod 32 is connected in an articulated manner by a ball 44 of a rocker bar 45 connected in an articulated manner at its end opposite to ball 44 with a lever 46 for controlling the pivoting about the articulation axis of the king pin of the associated rear wheel. The mechanism 11 is rigidly fastened to the rear cross-member or to the rear part (not shown) of the body of the vehicle through the medium for example of fastening arms 47 integral with the longitudinal part 36 of housing 16. The plate 31 comprises two cam-forming parts 48 and 49 made in a symmetrical manner on both sides of the plane perpendicular to FIG. 3 and comprising the axis Y–Y' of shaft 10. Each cam-forming part is formed of a groove passing through plate 31 and whose profile defines the law of deflection of the rear wheels depending on the deflection of the front wheels, this law being for example the law defined by curves C1 and C2 in FIG. 2. The roller 29 or the roller 30 can move without clearance inside grooves 48 or 49, respectively, and exert a separate effect depending on the direction of the rotation of axes 26 and 27, respectively of both planet wheels 20 and 21. Each of the rollers 29 and 30 acts separately and without discontinuity upon one or the other of the cam-forming parts 48, 49. From the upper position shown in FIG. 5 where the two rollers are in contact respectively with the two cam-forming parts (zero position or parallel position of the wheels with respect to the longitudinal axis of the vehicle), when the front wheels are deflected towards the left or towards the right, only one roller drives or controls a corresponding cam-forming part and provokes the displacement of plate 31 and therefore of the steering rods 32 along axis X–X', and according to the defined law. The wheels move in the same manner when they come back to the zero position and when the front wheels are deflected in the direction opposite to the previous one, the first roller does not act any longer whereas the second roller acts upon the other corresponding cam-forming part. In the zero parallel state, the two roller-carrying axes 26 and 27 which are perpendicular to the plane P of plate 31, must be set at an equal distance from axis X–X' of the rod 32 for actuating the rocker bars of the rear wheel pivoting levers. It is to be noted that the planet carrier assembly rotates with gear reduction with respect to the speed of rotation of pinion 19 of shaft 10 so as to obtain a low angular rotational displacement about pinion 19 of the two axes 26, 27 carrying respectively the thrust rollers 29 and 30 of the cam-forming parts 48 and 49 of plate 31.

The housing 16 of the rear steering mechanism 11 comprises at its rear part a cap or cover 50 fastened for example by fastening screws 51 to the housing 16 and permitting to have directly accesss to plate 31 which therefore can be dismounted by unscrewing the screws 34 and replaced by another plate 31 having two cam-forming parts whose profile is different from the profile of the cam-forming parts 48 and 49 so as to define another law of deflection of the rear wheels as a function of the deflection of the front wheels and taking the vehicle into account.

Figure 6:
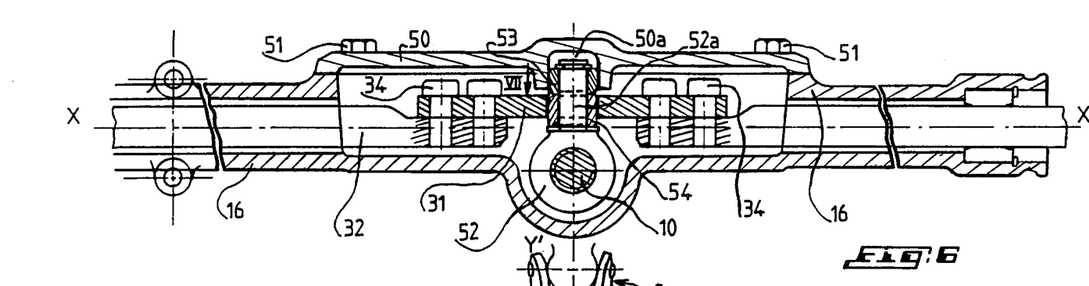
FIG. 6 is a cross-sectional view identical to that of FIG. 3 and showing a second embodiment of the device according to the invention.
Figure 7:
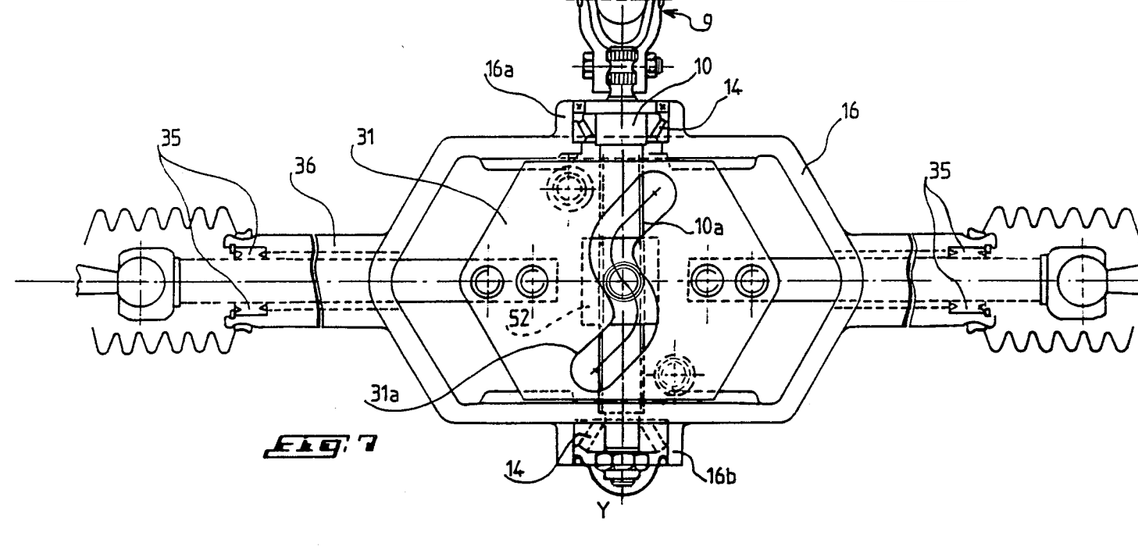
FIG. 7 is a view in the direction of arrow VII in FIG. 6.
Figure 8:
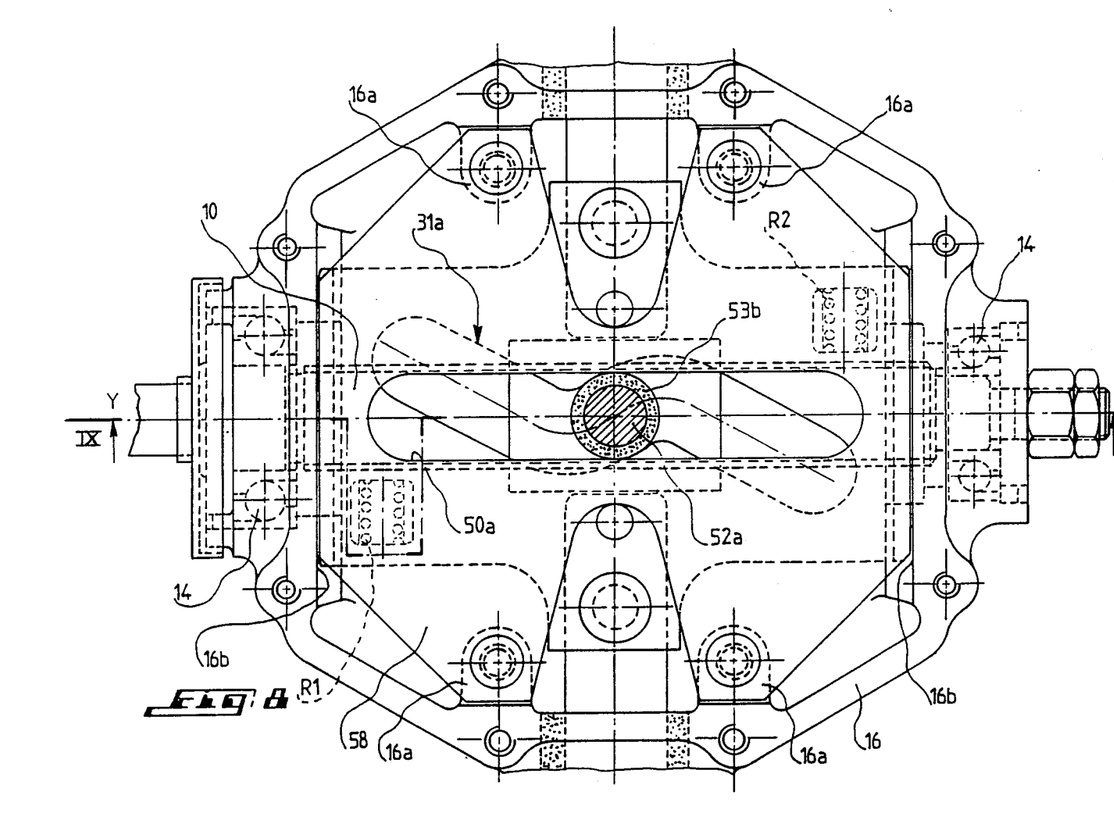
FIG. 8 is a cross-sectional view along line VIII—VIII of FIG. 9.
Figure 9:
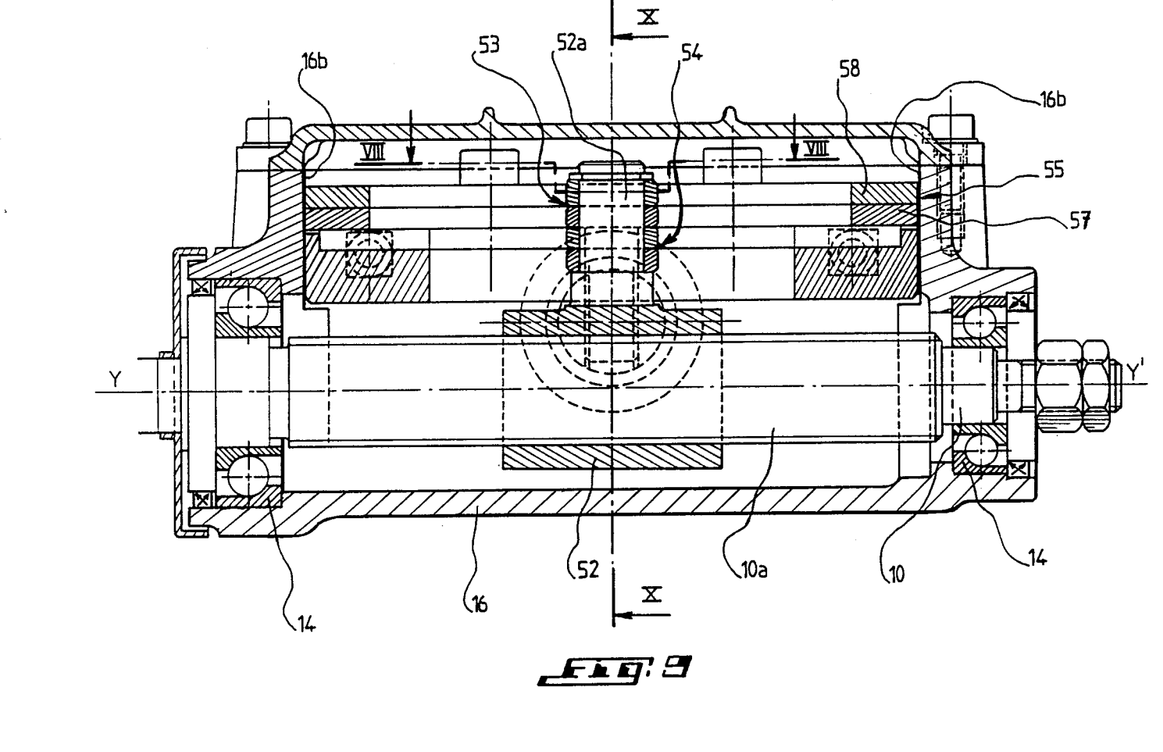
FIG. 9 is a cross-sectional view along line IX—IX in FIG. 8.
Figure 10:
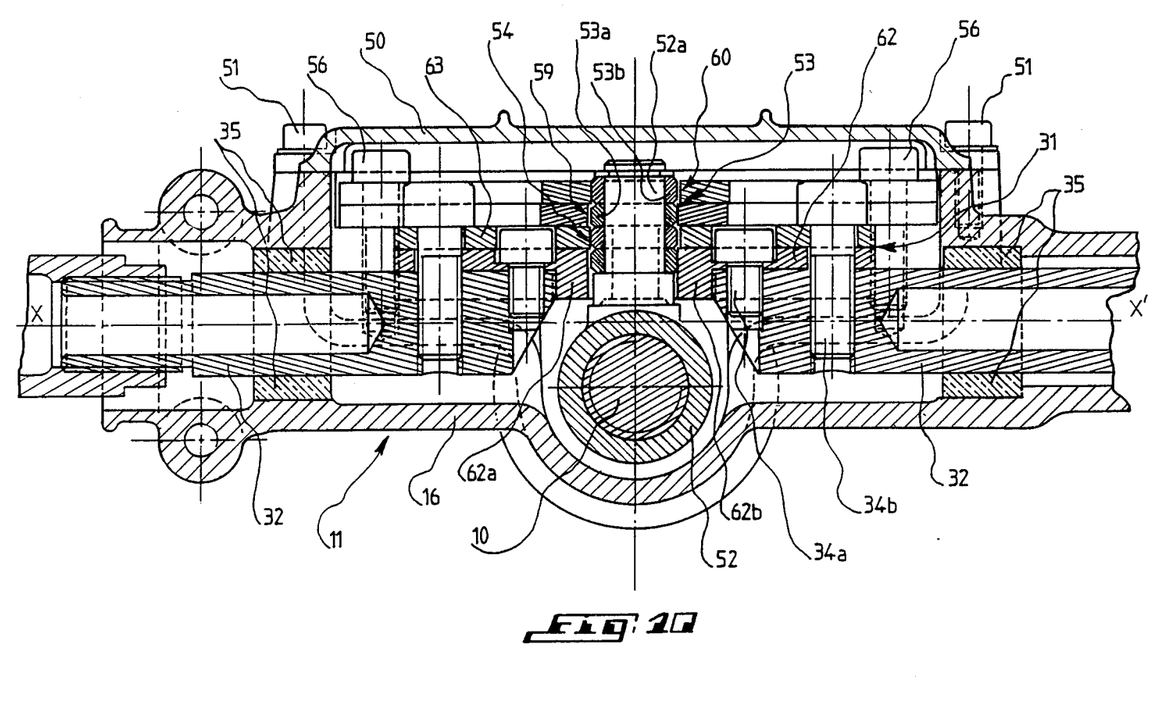
FIG. 10 is a cross-sectional view along line X—X in FIG. 9.

The second embodiment of the rear steering mechanism shown in FIGS. 6 and 7 will now be described.

The basic principle of this embodiment is similar to that of the first embodiment since the rear steering rods 32 controlling the pivoting of the rear wheels along axis X-X' in one direction or in the other direction from a middle position for setting the wheels of the vehicle in the zero parallel state are axially moved according to a pre-defined law.

According to this embodiment, the drive shaft 10, which is connected to the rear end of transmission main shaft through the medium of an articulated joint 9, is axially maintained inside housing 16 by front and rear bearings 14 in bearing supports 16a and 16b integral with housing 16. The shaft 10 comprises substantially along its whole length a threaded part 10a rotatably actuated from the front side by the transmission main shaft and the articulated joint 9. A nut-forming element 52 can move linearly on both sides of a central or medial position of the threaded part of shaft 10 corresponding to a setting in the zero parallel state of the rear wheels. This position is clearly shown in FIG. 7. The nut-forming element 52 comprises a roller-carrying pin or finger 52a solid with the same and perpendicular to its longitudinal axis. More precisely, the finger 52a carries a first upper roller 53 engaged in a guiding groove 50a of cover 50 parallel to the axis of shaft 10 and a second lower thrust roller 54 located inside a cam-forming part 31a of plate 31. The first roller 53 guides in a plane perpendicular to axis X-X' the displacement of the nut-forming element 52 and acts as a stop against rotation. The cam-forming part 31a is formed of a groove passing through plate 31 and having a profile which defines the law of deflection shown in FIG. 2, it being understood that any other profile can be predefined depending on the desired road behaviour of the vehicle. The plate 31 is rigidly fastened, through the medium of fastening screws 34, to the rear steering rods 32 mounted on bearings 35 inside bearing supports 36 integral with housing 16. The cover 50 is fastened to the housing 16 through the medium of fastening screws 51. This cover permits to have access to the fastening screws 34 to dismount the plate 31 and to replace it by another plate with a cam-forming part whose profile differs from that of the cam-forming part 31a so as to define another law of deflection of the rear wheels as a function of the deflection of the front wheels.

From the foregoing explanations, it is understood that the rotation of the transmission main shaft of the vehicle about its axis rotatably actuates shaft 10 whose threaded part moves the nut-forming element in a direction along axis Y-Y' perpendicular to axis X-X'. The nut-forming element 52 is guided during its movement by roller 53 whereas roller 54 acts upon the cam-forming part to move plate 31 together with steering rods 32 along axis X-X' in a direction depending upon the direction of displacement of the nut-forming element 52. Thus, the steering rods 32 control the pivoting of the rear wheels as a function of the deflection of the front wheels according to the predefined law.

The above-described device for controlling the rear wheels according to the Present invention is of a simple and tight structure whose stability is comparable with that of a mechanical front steering and has as an important advantage that the law of deflection of the rear wheels as a function of the deflection of the front wheels can be changed by changing the plate comprising the cam-forming parts.

Referring to FIGS. 8 to 11, a third embodiment of the device according to the Present invention will now be described through which the second embodiment previously described is improved.

As already explained, the drive shaft 10 is rotatably mounted inside housing 16 of rear steering mechanism 11 through the medium of front and rear ball bearings 14 solid with housing 16. The shaft 10 comprises along substantially its whole length the threaded part 10a rotatably actuated from the front side by transmission main shaft 8 and articulated joint 9. The nut-forming element 52 can move linearly on both sides of a central or medial position of the threaded part of shaft 10 corresponding to a setting in the zero parallel state of the rear wheels. The nut-forming element 52 carries finger 52a which is solid with it and perpendicular to its longitudinal axis and which carries the first and second superimposed roller-forming parts 53 and 54. the first lower thrust roller-forming parts 54 is arranged in an engaged manner inside the substantially S-shaped cam-forming groove 31a made through plate 31, which plate is rigidly connected to both rear steering rods 32 through the medium of fastening screws 34a and 34b, which rods 32 are guided during their axial movements along axis X-X' by two pairs of bearings 35 solid with housing 16. The cam-forming groove 31a defines the abovementioned law of deflection. The second upper roller-forming part 53 is engaged inside guiding groove 50a located above drive shaft 10 in a parallel direction with the latter and made through a plate 55 solid with housing 16 through the medium fastening screws 56. The second roller-forming part 53, by moving inside guiding groove 50a, guides along axis Y-Y' perpendicular to axis X-X', the displacement of the nut-forming element 52 and acts as a stop against rotation for the latter.

Figure 11:
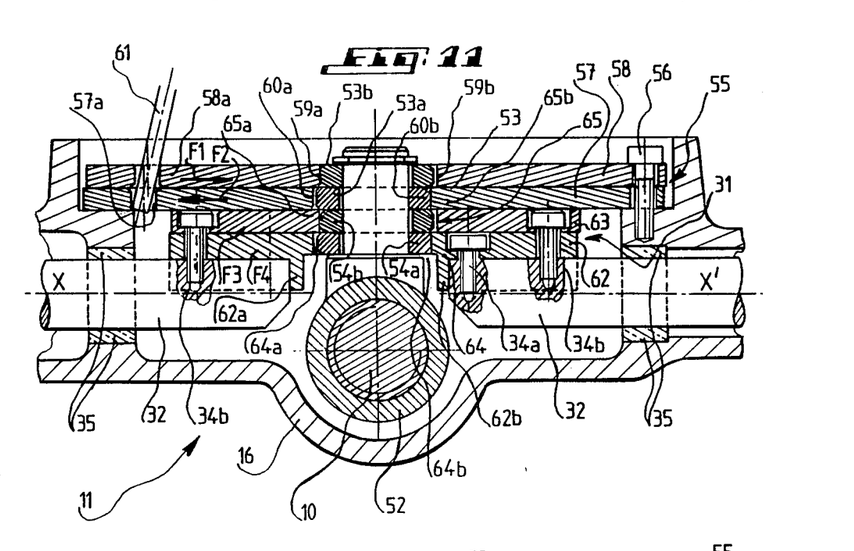
FIG. 11 is a view similar to FIG. 10.

The guiding plate 55 is formed of two superimposed lower 57 and upper 58 plates respectively comprising two lower 59 and upper 60 longitudinal grooves with identical widths and which define the guiding groove 50. Both plates 57 and 58 are fastened to fastening ears or lugs 16a integral with housing 16, each of which comprising an internal thread for the screwing of each fastening screw 56 through both plates 57 and 58. The machined surfaces for supporting the ears 16a are located in a same plane so that the lower plate 57 rests on these machined surfaces while being parallel to plate 31 and slightly shifted above the latter. Moreover, before being fastened to ears 16a, the two plates 57 and 58 can be displaced with respect to each other along the direction of axis X-X' while being guided, at their side walls parallel to axis X-X', by two opposite walls 16b machined in housing 16 and also parallel to the plane perpendicular to FIG. 1 comprising axis X-X'. More precisely, the two plates 57 and 58 comprise respectively two approximately coaxial through holes 57a, 58a into which the extreme part of an operating tool or lever 61 can be introduced which, when it is inclined as shown in FIG. 11, rest in an opposite manner inside holes 57a and 58a so as to move plate 57 in the direction opposite to plate 58. Of course, the introduction of lever 61 into holes 57a and 58a occurs after removal of the cover 50 which is fastened to housing 16 with the aid of fastening screws 51. The second roller-forming part 53 comprises two superimposed rollers 53a and 53b likely to move respectively inside the two lower 59 and upper 60 grooves. Each of the roller 53a and 53b has the same outer diameter which is lower than the width of each groove 59 and 60 whereas its inner diameter is slightly larger than the diameter of finger 52a. Before both plates 57, 58 are rendered solid with housing 16, these are moved in opposite directions with respect to each other in the direction of axis X-X' with the aid of lever 61 which thus exerts on the two plates 57 and 58 forces or stresses F1 and F2 respectively with opposite directions perpendicular to drive shaft 10 and crossing the axis of finger 52a. The forces F1 and F2 exert such an action that the lower roller 53a rests, substantially without any clearance, between finger 52a and the side wall 59a of groove 59 located on the left-hand side of the axis of finger 52a and that the upper roller 53b rests, also substantially without any clearance, beteween finger 52a and the side wall 60b of groove 60 located on the right-hand side of the axis of finger 52a and therefore opposite to side wall 59a. The relative movement in opposite directions of the two plates 57 and 58 with the aid of lever 61 consists therefore in eliminating the backlash which may occur between the second roller-forming part 53 and the guiding groove 50a while permitting either the rollers 53a, 53b to rotate around the axis of finger 52a and inside their respective grooves 59, 60. Of course, the lever 61 can be actuated in the direction opposite to the direction shown in FIG. 4 in order to exert efforts F1, F2 respectively opposite to the abovementioned efforts F1 and F2 in such a manner that the roller 53a rests, substantially without any clearance, between finger 52a and the side wall 60a of groove 60 opposite to side wall 60b and that the roller 53b rests between finger 52a and the side wall 59b of groove 59 opposite to side wall 59a, which permits also eliminating substantially any relative clearance between the second roller-forming part 53 and the guiding groove 50a of plate 55. The forces F1 and F2 are maintained during the screwing of fastening screws 56 which immobilize the two plates 57, 58 with respect to each other and render them solid with housing 16.

The plate 31 is also formed of two superimposed lower 62 and upper 63 plates comprising respectively two identical lower 64 and upper 65 grooves each of which being for example substantially S-shaped to define the cam-forming groove 31a. The lower plate 62 comprises two shoulders 62a and 62b which are solid under it and against which rest respectively the two free ends of the two rear steering rods 32 which are axially movable along axis X-X'. The lower plate 62 is fastened to rods 32 through the medium of fastening screws 32a. The upper plate 63 is fastened to the lower plate 62 by fastening screws 34b passing through plate 62 and being screwed in the rear steering rods 32. As in the case of the two plates 57 and 58, the plates 62 and 63 can be moved or shifted with respect to each other by applying to these, with the aid of a lever (not shown) identical to lever 61, opposite efforts or stresses F3 and F4 perpendicular to the longitudinal axis of drive shaft 10 and crossing the axis of finger 52a. The first roller-forming part 54a is formed of two superimposed lower 54a and upper 54b rollers whose outer diameters are identical and are lower than the width of the two cam-forming grooves 64 and 65 and whose inner diameters are larger than the diameter of finger 52a. In order to eliminate any relative clearance between the roller-forming part 54 and the cam-forming groove 31a, the lower plate 62 is first fastened to rods 32 by fastening screws 34a to maintain the rods 32 and the plate 62 in a same plane and, before fastening the upper plate 63 to plate 62 with the aid of fastening screws 34b, efforts or stresses F3 and F4 are exerted on plates 62 and 63 in such a manner that roller 54a rests, substantially without any clearance, between finger 52a and the side wall 64b of groove 64, located on the right-hand side of the axis of finger 52a as shown in FIG. 11, and that roller 54b rests, substantially without any clearance, between finger 52a and the side wall 65a of groove 65 opposite to the side wall 64b of groove 64. The backlash elimination between the first roller-forming part 54 and the cam-forming groove 31a can also be performed by exerting efforts or stresses F3 or F4 opposite respectively to stresses F3 and F4 shown in FIG. 11 so that roller 54a rests between the side wall 64a of groove 64 opposite to the side wall 64b and that roller 54b rests, substantially without any clearance, between the side wall 65b of groove 65 opposite to the side wall 65a, and finger 52a. By maintaining the efforts F3 and F4, the two plates 62, 63 are immobilized with respect to each other by screwing fastening screws 34b. As in the case of plates 57 and 58, the plates 62 and 63 are guided along axis X-X', at their opposite side walls parallel to axis X-X', by the guiding walls 16b of housing 16, during the operation of backlash elimination.

Figure 12:
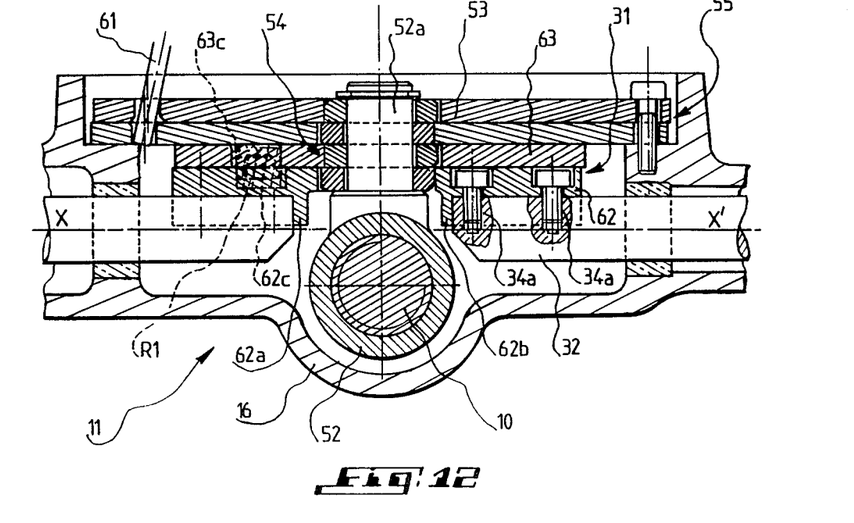
FIG. 12 is a cross-sectional view identical to the cross-sectional view of FIG. 10 and showing another embodiment of the Present invention.

Taking into account the machining problems to obtain inside plates 62 and 63 cam-forming grooves 64, 65 without dimension deviations between them, the embodiment shown in FIG. 12 permits overcoming these problems.

This embodiment differs from the embodiment shown in FIGS. 8 to 11 only by the structure of plate 31, the other elements shown in FIG. 12 being identical to those of the third embodiment.

The plate shown in FIG. 12 is also formed of the two lower 62 and upper 63 plates, the lower plate 62 comprising also the shoulders 62a and 62b against which rest respectively the two free ends of the two rear steering rods 32 to which plate 62 is fastened with the aid of fastening screws 34a. The upper plate 63 is mounted in a freely sliding manner and is guided along axis X-X' by the guiding walls 16b of housing 16 between the lower plate 57 of guiding plate 55 and the lower plate 62. Means formed of two compression springs R1 and R2 are located between the two plates 62 and 63 so as to steadily exert opposite efforts or stresses F3 and F4 perpendicular to drive shaft 10 and crossing the axis of finger 52a to maintain the two plates 62 and 63 in a shifted condition with respect to each other, therefore eliminating any backlash occurring between the roller-forming part 54 and the cam-forming groove 31a as explained in the third embodiment. More precisely, the two springs R1 and R2 are interposed between the two plates 62 and 63, on the one hand, on both sides of axis X-X' at an equal distance from this one and, on the other hand, on both sides of axis Y-Y' at an equal distance from this one and are each mounted in a prestressed and balanced manner inside two complementary recessing-forming recesses 62c and 63c formed respectively inside the two plates 62 and 63. Each spring R1 and R2 rests at one of its extreme turns against an end wall of recessing 63c perpendicualr to the plane of FIG. 12 and at is other opposite extreme turn against an end wall of recessing 62c parallel and opposite to the aforementioned end wall of recessing 63c. Therefore, the springs R1, R2 permit exerting efforts F3 and F4 between plates 62 and 63 so that the two thrust rollers 54a and 54b rest respectively on the two plates 62 and 63. This embodiment has as an advantage that it facilitates the machining of the cam-forming grooves by having less strict manufacturing tolerances and that it facilitates the mounting or assembling of the different elements of the invention.

Various modifications may be made to the two last above-described embodiments of the invention. For example, the rollers 53a, 53b, 54a and 54b can be replaced by ball or needle bearings to obtain a better mechanical efficiency. Moreover, any resilient element other than prestressed compression springs can be used to exert efforts F3 and F4 between plates 62 and 63.

By using the rear steering control device according to the invention, in the case of an automotive vehicle with four driving wheels, one can be sure to have a precise and accurate steering without impairing its stability. Moreover, this device, while remaining simple, permits to obtain the same level of quality as the conventional front steerings.

What is claimed is:

1. A rear steering control device for an automotive vehicle with four guiding wheels, whose rear wheels are mounted on pins and are connected through a medium of articulated rocker bars with steering rods which control, through the medium of the rocker bars, levers for pivoting the rear wheels, where the steering control device includes a transmission main shaft mounted longitudinally with respect to the vehicle and is provided with means for rotating said transmission main shaft about its axis as a result of an action of deflection of the front wheels of the vehicle and said control device further including a rear steering mechanism mechanically connected at a first position with a rear end of the transmission main shaft through the medium of a drive shaft and at a second position with the rear steering rods, said rear steering mechanism controlling the deflection of the rear wheels as a function of the deflection of the front wheels, wherein the rear steering mechanism comprises:
    a plate rigidly and removably fastened to the rear steering rods and which includes at least one sinuous groove provided therein forming a cam the profile of which defines the law of deflection of the rear wheels according to the deflection of the front wheels; and
    a roller-forming part, in engagement with the sinuous groove and mechanically driven by the drive shaft wherein the rotation of the transmission main shaft causes the roller-forming part to directly exert a thrust on the sinuous groove.

2. A device according to claim 1, wherein said sinuous groove is provided through said plate.

3. A device according to claim 1, wherein said rear steering mechanism further comprises:
    a statutory ring gear;
    three angularly equidistant planet wheels connected through a plant carrier formed of two flanges rotatably centered on said drive shaft and rigidly connected to one another by three axles respectively of the three planet wheels, which planet wheels mesh with the inside of said stationary ring gear, and wherein at least one of the axles of the planet wheels is extended to carry said roller-forming part.

4. A device according to claim 1, wherein said plate comprises two symmetrical grooves forming cams, and two of the axles of the plant wheels are extended to carry respectively two thrust rollers, one or the other of the thrust rollers meshing with a corresponding one of said two symmetrical grooves depending on the direction of deflection of the front wheels.

5. A device according to claim 1 comprising means for stopping each of the rear steering rods against rotation about their axis.

6. A device according to claim 1, wherein said drive shaft is arranged longitudinally with respect to the vehicle and is rotatably mounted by means of front and rear bearings carried by a housing of the rear steering mechanism, said drive shaft comprising a threaded part on which a nut-forming element is mounted which is solid with a finger carrying said thrust roller-forming part which is engaged in said sinuous groove, the rear steering control device further comprising means for stopping the nut-forming element against rotation.

7. A device according to claim 6, wherein a second roller-forming part is mounted at the free end of the finger above the thrust roller-forming part, the second roller-forming part being engaged in a stationary groove for guiding and stopping against rotation which runs parallel to the drive shaft.

8. A device according to claim 6, further comprising
    a plurality of plates wherein a first plate comprises two superimposed plates, a first lower and a first upper plate respectively comprising a lower and an upper groove defining the cam-forming groove, the first lower plate being fastened to the rear steering rods, two roller forming parts, a first roller-forming part comprising two superimposed rollers likely to move respectively inside the lower and upper grooves, and
    means for maintaining the first upper plate in a shifted position with respect to the lower plate so that the upper roller rests, substantially without any clearance, between the finger and a side wall of the upper groove and the lower roller rests, substantially without any clearance, between the finger and a side wall of the lower groove opposite to the side wall of the upper groove, the outer diameter of each roller being smaller than the width of each groove.

9. A device according to claim 8, wherein a second plate is formed of two superimposed plates, a second lower and a second upper plate comprising respectively a second lower and a second upper groove defining the guiding groove, a second roller-forming part comprises two superimposed rollers likely to move respectively inside the second lower and second upper grooves and the second lower and upper plates are immobilized with respect to each other in a shifted position, by a fastener so that an upper roller rests, substantially without any clearance, between the finger and a side wall of the upper groove and the lower roller rests, substantially without any clearance, between the finger and a side wall of the lower groove opposite to the side wall of the upper groove, the outer diameter of each roller being smaller than the width of each groove.

10. A device according to claim 9, wherein the second lower and upper plates of said second plate are rendered solid with each other and with the housing of the rear steering mechanism after having been submitted to opposite stresses perpendicular to the drive shaft and crossing the axis of the finger so as to obtain said shifting of the upper plate with respect to the lower plate.

11. A device according to claim 9, wherein the second upper and lower plates of said second plate are rendered solid with the housing of the rear steering mechanism by said fastener.

12. A device according to claim 8, wherein said means for maintaining the first upper plate with respect to the first lower plate are includes fastening screws which render the upper plate solid with the rear steering rods after opposite stresses perpendicular to the drive shaft and crossing the axis of said finger have been applied to the first lower and upper plates in order to obtain said shifting of the first upper plate with respect to the first lower plate.

13. A device according to claim 8, wherein the first upper plate of said first plate is mounted in a freely sliding and guided manner in the housing of the rear steering mechanism between the lower plate of the second plate and the lower plate of the first plate and wherein said means for maintaining the first upper plate of the first plate in a shifted position with respect to the first lower plate comprises two identical prestressed compression springs each located at one end thereof on either side of the axis of the rear steering rods at an equal distance from the same and, on the other end thereof on both sides of the drive shaft at an equal distance from the latter and each housed, in a balanced manner, inside two complementary recessing-forming recesses formed respectively in the upper and lower plates and resting at its two extreme turns respectively on a corresponding end wall of the recess of the upper plate and on a corresponding end wall of the recess opposite to the end wall of the recess so as to steadily exert forces which are perpendicular to the drive shaft and which cross the axis of the finger to maintain the first upper and lower plates in a shifted position with respect to each other.

14. A device according to claim 8, wherein the first lower plate comprises two shoulders solid under the same and against which rest respectively the two free ends of the two rear steering rods, and is fastened on these rods by means of fastening screws.

15. A rear steering control device for an automotive vehicle with four guiding wheels whose rear wheels are mounted on pins and are connected through a medium of articulated rocker bars with steering rods which control, through the medium of the rocker bars, the levers for pivoting the rear wheels where the steering control device includes a transmission main shaft mounted longitudinally with respect to the vehicle and is provided with means for rotating said transmission main shaft about its axis as a result of an action of deflection of the front wheels of the vehicle and said control device further including a rear steering mechanism mechanically connected at a first position with the rear end of the transmission main shaft through the medium of a drive shaft and at a second position with the rear steering rods controlling the deflection of the rear wheels as a function of the deflection of the front wheels, wherein the rear steering mechanism comprises:
a first plate rigidly and removable secured to the rear steering rods through fastening screws and which includes at least one sinuous groove provided therein forming a cam, the profile of which defines the law of deflection of the rear wheels according to the deflection of the front wheels; and
a roller-forming part in engagement in the sinuous groove and mechanically driven by the drive shaft so that the rotation of the transmission main shaft causes the roller-forming part to directly exert a thrust on the sinuous groove; wherein said first plate is removable from said roller-forming part allowing said first plate to be replaced by another plate having at least one sinuous groove provided therein forming a cam, the profile of which is different from the profile of the sinuous groove of said first plate.

* * * * *